United States Patent [19]

Eyer et al.

[11] Patent Number: 5,398,237

[45] Date of Patent: Mar. 14, 1995

[54] ACQUISITION AND TRACKING OF INDEPENDENT QUADRATURE MODULATED BITSTREAMS

[75] Inventors: Mark K. Eyer, San Diego; Paul Moroney, Olivenhain; Kent Walker, Escondido; Harris Simon; Stephen K. How, both of San Diego, all of Calif.

[73] Assignee: GI Corporation, Hatboro, Pa.

[21] Appl. No.: 65,578

[22] Filed: May 26, 1993

[51] Int. Cl.⁶ .............................................. H04J 11/00
[52] U.S. Cl. ...................................... 370/20; 375/54; 375/281
[58] Field of Search .................. 375/1, 39, 54, 108, 375/111; 370/19, 20, 12; 380/10, 17, 42, 43; 371/5.4, 43, 47.1; 348/469, 471, 473, 475, 500, 536, 537

[56] References Cited

U.S. PATENT DOCUMENTS

| | | | |
|---|---|---|---|
| 4,691,318 | 9/1987 | Entermann | 375/54 |
| 4,807,230 | 2/1989 | Srinivasagopalan | 375/39 |
| 4,837,786 | 6/1989 | Gurantz et al. | 370/20 |
| 4,882,725 | 11/1989 | Noda et al. | 370/20 |

Primary Examiner—Benedict V. Safourek
Attorney, Agent, or Firm—Barry R. Lipsitz

[57] ABSTRACT

A desired information stream is recovered from a pair of independent bitstreams transmitted using quadrature modulation. One of the independent bitstreams is altered by an invertible alteration function prior to transmission. The quadrature modulated bitstreams are demodulated at a receiver to provide a demodulated I bitstream and a demodulated Q bitstream. One of the demodulated I and Q bitstreams is tentatively provided for decoding. The tentatively provided bitstream can be optionally inverted. One of the tentatively provided bitstream and the optionally inverted bitstream is decoded if it is desired to recover the bitstream that was not altered by the alteration function prior to transmission. One of the tentatively provided bitstream and the optionally inverted bitstream is decoded after applying the inverse of the alteration function thereto if it is desired to recover the bitstream that was altered by the alteration function prior to transmission. An error rate of data decoded during the decoding step is determined. If the error rate is not acceptable, different choices of the demodulated I and Q bitstreams with and without inversion are tried until an acceptable error rate is obtained.

20 Claims, 3 Drawing Sheets

ACQUISITION AND TRACKING OF INDEPENDENT QUADRATURE MODULATED BITSTREAMS

BACKGROUND OF THE INVENTION

The present invention is concerned with the communication of quadrature modulated digital data, and more particularly to the acquisition and tracking of two independent digital bitstreams communicated using quadrature phase shift keyed (QPSK) modulation or the like.

Quadrature modulation techniques are well known for the transmission of digital data. In quadrature modulation, two carrier components are modulated ninety degrees apart in phase by separate modulating functions. One of the many applications in which quadrature modulation techniques can be useful is in the communication of digital television signals, such as high definition television (HDTV) signals. The digital transmission of standard television signals, for example under the National Television Systems Committee (NTSC) format, can also benefit from the use of quadrature modulation.

In a communication system employing quadrature modulation (such as QPSK modulation) to transmit two independent digital bitstreams, coding schemes may be employed to provide error detection and correction at the receiver. In order to first acquire and then track a digital bitstream in the presence of noise, a means must be provided to enable the receiver to synchronize to the incoming signal and quickly identify the bitstream of interest. After the receiver "acquires" the bitstream of interest, it is not unusual for a low signal-to-noise level or the presence of an interfering signal to cause the loss of carrier lock in the quadrature demodulator. When this occurs, the receiver must detect the loss of lock and be able to regain the lock as quickly as possible. This is referred to as "tracking" the received signal.

In applications such as the digital transmission of HDTV or NTSC video, reestablishment of synchronization following its loss must occur within a period of milliseconds. Otherwise, significant visible degradation to the video image can result.

It would be advantageous to provide an apparatus and method for rapidly identifying and selecting a desired bitstream from a received quadrature modulated signal. It would be further advantageous to provide such a system that will quickly reidentify and reacquire a desired bitstream following momentary loss of carrier phase lock. It would be still further advantageous for the system to enable the rapid reidentification and reacquisition of the desired bitstream after a slip in carrier phase.

The present invention provides a method and apparatus enjoying the aforementioned advantages.

SUMMARY OF THE INVENTION

In accordance with the present invention, apparatus is provided for communicating dual bitstream quadrature modulated digital data. A first encoder encodes a first stream of digital information data, e.g., to facilitate error detection and correction at a receiver. A second encoder encodes a second stream of digital information data. Means are provided for applying an invertible alteration function to the first stream of data to alter the first stream in a manner that will produce a high error rate if the first stream is decoded without first applying the inverse of the alteration function. For purposes of the present disclosure, an "invertible alteration function" is defined as an alteration function that has an inverse. Means are provided for quadrature modulating the altered first stream of data and the second stream of data to provide separate in-phase (I) and quadrature (Q) data streams for transmission.

Decoder apparatus is provided for recovering a desired one of the first and second information streams from the transmitted quadrature modulated data. A quadrature demodulator is coupled to receive the quadrature modulated data. The demodulator outputs a demodulated in-phase bitstream and a demodulated quadrature bitstream. First switch means coupled to the demodulator select one of the demodulated I and Q bitstreams. An inverter is coupled to invert the bitstream selected by the first switch means. Second switch means selectively output either the bitstream selected by the first switch means or the inverted bitstream from the inverter. The inverse of the alteration function is applied to the bitstream that is output from the second switch means. Third switch means select the desired one of the first and second information streams by selectively outputting to a decoder either the bitstream output from the second switch means or the inverse altered version thereof.

In a preferred embodiment, the decoder determines an error rate of data decoded thereby. Such an error rate can be inferred, for example, from a Viterbi decoder normalization rate. Means responsive to the error rate determination are provided for actuating the first and second switch means to achieve an acceptable error rate by trial and error. In this manner, the decoder can be initially provided with a bitstream which is believed to be the desired bitstream, not inverted, and passed through the inverse alteration function only if the desired bitstream is the one that was altered at the transmitter. If the decoder does not achieve an acceptable error rate based on this selection, various alternatives are tried. For example, the initially selected bitstream can be inverted prior to decoding. If an acceptable error rate is obtained, it means that the correct signal was selected, but it was inverted during transmission. If the error rate is still unacceptable, the other signal will be selected from the quadrature demodulator and input to the decoder with or without inversion, until an acceptable error rate is achieved, indicating that the desired signal has been acquired.

The alteration function may or may not be synchronized in time with the first encoder. If it is not synchronized, means are provided at the decoder for synchronizing the inverse alteration function with the alteration function applied at the transmitter. For example, the synchronizing means can be responsive to the error rate determination for obtaining synchronization by trial and error.

The decoder can monitor the error rate (or related parameter, such as a normalization rate) it determines on an ongoing basis. In such an embodiment, the means for actuating the first and second switch means are responsive to the monitoring for reactuating the switches to return to an acceptable error rate in the event that the error rate rises above an acceptable level. This technique provides tracking of the desired signal once it is acquired.

A second invertible alteration function can be applied to the second stream of data at the transmitter, to alter the second stream in a manner that will produce a high error rate if the second stream is decoded without first applying the inverse of the second alteration function. The second alteration function will be independent of and different from the first invertible alteration function, so that the application of the wrong inverse alteration function will not enable an acceptable error rate to be achieved at the receiver.

In an embodiment in which a second invertible alteration function is used, means are provided at the decoder for applying the inverse of the second alteration function to the bitstream output from the second switch means. The third switch means will then select the desired one of the first and second information streams by selectively outputting to the decoder either the bitstream to which the inverse alteration function has been applied or the bitstream to which the second inverse alteration function has been applied.

A receiver is provided for recovering a desired information stream from a pair of independent bitstreams transmitted using quadrature modulation. At least one of the independent bitstreams is altered by an invertible alteration function prior to transmission. A quadrature demodulator is coupled to receive quadrature modulated data, and outputs a demodulated I bitstream and a demodulated Q bitstream. First switch means coupled to the demodulator select one of the demodulated I and Q bitstreams. An inverter is coupled to invert the bitstream selected by the first switch means. Second switch means selectively output either the inverted bitstream from the inverter or the bitstream selected by the first switch means. Means are provided for applying the inverse of the alteration function to the bitstream output from the second switch means. Third switch means select the desired information stream by selectively outputting to a decoder either the bitstream output from the second switch means or an inverse altered version thereof from the inverse alteration function applying means.

A method is provided for recovering a desired information stream from a pair of independent bitstreams transmitted using quadrature modulation. One of the independent bitstreams is altered by an invertible alteration function prior to transmission. The quadrature modulated bitstreams are demodulated to provide a demodulated in-phase bitstream and a demodulated quadrature bitstream. One of the demodulated I and Q bitstreams is tentatively provided for decoding. The tentatively provided bitstream can optionally be inverted. One of the tentatively provided bitstream and the optionally inverted bitstream is decoded if it is desired to recover the bitstream that was not altered by the alteration function prior to transmission. However, if it is desired to recover the bitstream that was altered by the alteration function, one of the tentatively provided bitstream and the optionally inverted bitstream is decoded after applying the inverse of the alteration function thereto. An error rate or related parameter (e.g., normalization rate) of data decoded during the decoding step is determined. If the error rate or related parameter is not acceptable, different choices of the demodulated I and Q bitstreams with and without inversion are input to the decoder in an attempt to obtain an acceptable error rate. In an embodiment where both of the independent bitstreams are altered prior to transmission with different invertible alteration functions, the decoding step is performed after applying the inverse of the alteration function that was used to alter the bitstream that is desired to be recovered.

DESCRIPTION OF THE PREFERRED EMBODIMENTS

Figure 1:
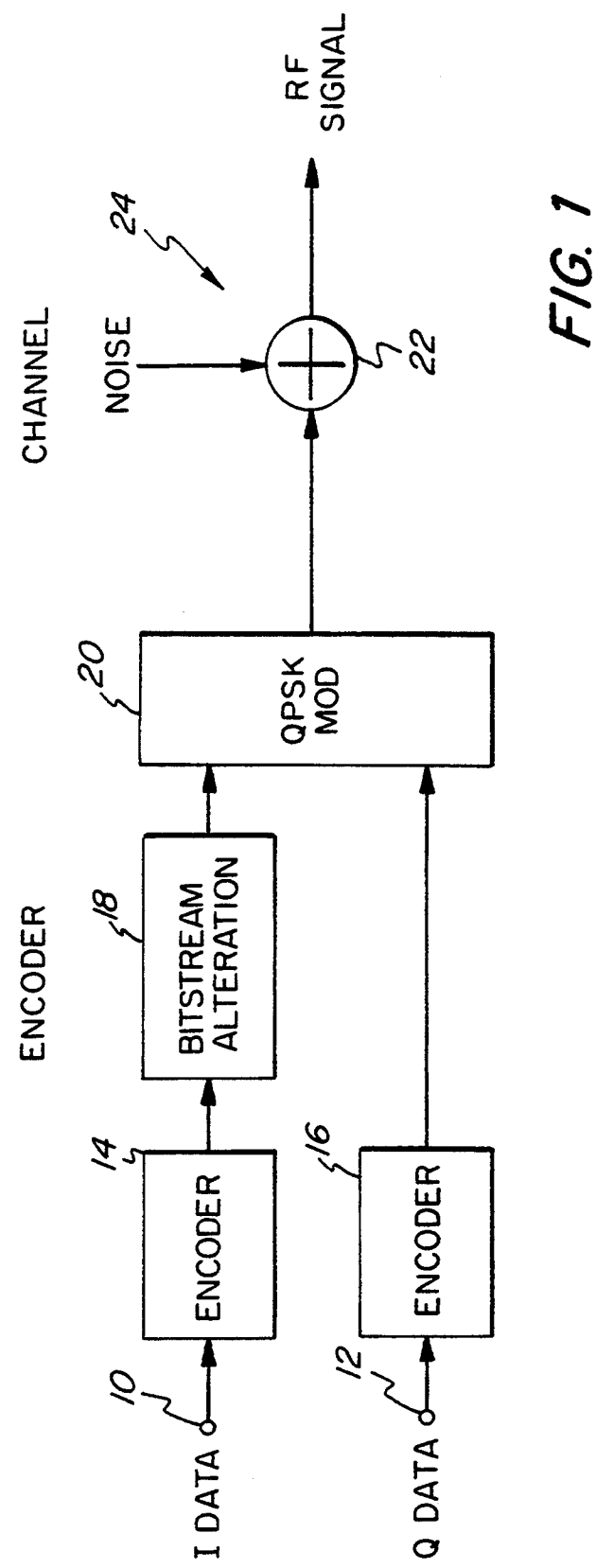
FIG. 1 is a block diagram illustrating components of an encoder in accordance with the present invention.

The present invention provides an implementation of a dual bitstream communication system in which rapid reacquisition of a desired bitstream is achieved in a reliable manner. The invention overcomes prior art implementations in which the two bitstreams may be indistinguishable from one another, resulting in the selection of the wrong bitstream at the decoder without the generation of sufficient coding errors over time to correct the erroneous selection. The erroneous selection made by such prior art schemes could result, for example, from a phase slip in the quadrature modulated carriers.

In accordance with the present invention, the two bitstreams are rendered orthogonal to one another (i.e., distinguishable) at the transmitter from the point of view of the decoder. This is accomplished by applying, at the transmitting side, an "alteration function" of some kind to one of the bitstreams. The choice of the bitstream alteration function is arbitrary, as long as it is an invertible function and it has the property that when it is applied at the encoder, and the inverse function is not applied at the decoder, a high rate of errors will result in the decoder when properly time aligned. The rate of errors must be high enough to detect reliably. Since syndrome problems and other characteristics of the type of coding and code generation selected may cause some alteration functions to produce a decoder error rate that is too low, a candidate function must be tested prior to final selection.

If the bitstream that is desired to be recovered at the decoder is the one that has been altered, the inverse of the bitstream alteration function is applied to the incoming data at the decoder. If the wrong bitstream is encountered during resolution of quadrature phase ambiguity at the receiver, errors will result in the decoded data. By using an alteration function on one of the bitstreams, only the desired polarity and bitstream will generate a low error rate.

It should be appreciated that both bitstreams can be subjected to a different alteration function, as long as the altered bitstreams are mutually orthogonal. In this case, the decoder will apply the appropriate inverse alteration to the incoming data in order to identify the desired bitstream.

The bitstream alteration function must be time aligned with the data in such a way that the receiver can apply it in the correct temporal position. If such alignment is not possible or is inconvenient, another degree of freedom can be added to the receiver's acquisition algorithm such that it can try various alignments until a low error rate is obtained in the decoder. Those skilled in the art will appreciate that depending upon the period of the alteration function, this type of trial and error approach might result in unreasonably long acquisition, or generate the need for extra hardware in the decoder.

Such problems can be overcome by proper design as discussed in greater detail below. Alternatively, a bitstream alteration function can be chosen which does not require time synchronization, as long as the alteration function meets the requirements of having an inverse and providing a high rate of errors if its inverse is applied to the wrong bitstream at the decoder.

FIG. 1 illustrates an embodiment of an encoder in accordance with the present invention. In quadrature modulation, such as QPSK, two separate bitstreams are modulated. An in-phase carrier is modulated by I data. A quadrature carrier is modulated by Q data. In the FIG. 1 implementation, I data is input to an encoder 14 via terminal 10. The I bitstream is encoded (e.g., to enable forward error correction, as well known in the art) in an encoder 14. Similarly, the Q data is input to terminal 12, for encoding by an encoder 16. Encoders 14, 16 provide coded I and Q bitstreams, respectively. The type of encoding provided by the encoders is not material to the present invention. Any known type of encoding such as convolutional or block coding could be used.

The encoded I bitstream output from encoder 14 is subjected to a bitstream alteration function 18, resulting in an altered coded bitstream for input to a QPSK modulator 20. The coded Q data bitstream from encoder 16 is input directly to QPSK modulator 20. The quadrature modulated bitstreams output from modulator 20 are transmitted through a communication channel generally designated 24, which degrades the modulated signal as well known in the art. For example, channel 24 can introduce noise into the transmitted signal, as indicated schematically by adder 22.

Figure 2:
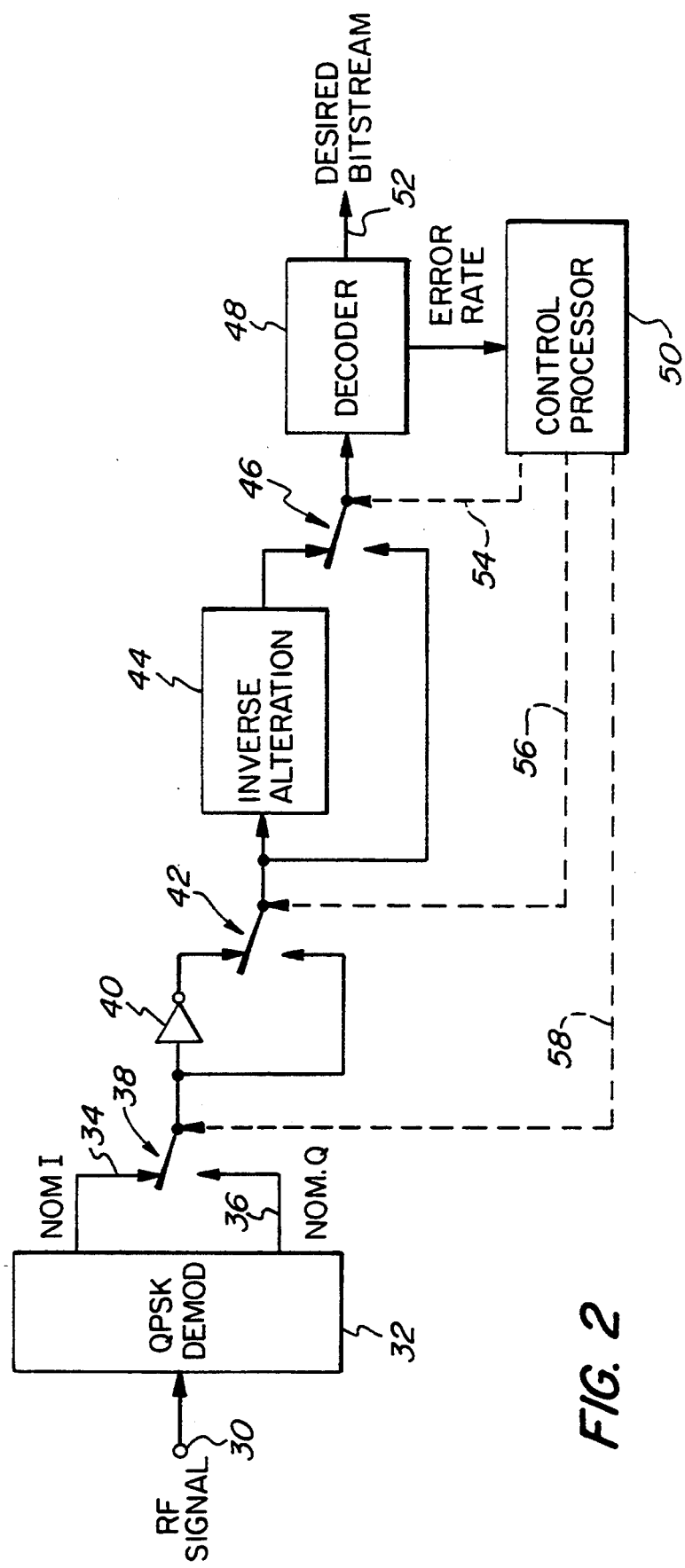
FIG. 2 is a block diagram of receiver components in accordance with the present invention.

The resulting noisy RF signal is received by a decoder such as that illustrated in FIG. 2. The received signal is input to a QPSK demodulator 32 via terminal 30. Demodulator 32 produces a "nominal I" demodulated bitstream 34 and a "nominal Q" demodulated bitstream 36. Due to quadrature phase ambiguity, upon any particular acquisition the bitstream 34 may be I, inverted I, Q, or inverted Q. In all phase rotations, either bitstream 34 or 36 will be the desired bitstream, and it may or may not be inverted. Further, in all phase rotations if bitstream 34 is the I bitstream, bitstream 36 will be the Q bitstream. On the other hand, if bitstream 34 is the Q bitstream, bitstream 36 will be the I bitstream.

A switch 38 allows selection of either the nominal I bitstream 34 or nominal Q bitstream 36. The selected bitstream is passed through an inverter 40, and can be selected in its noninverted form or its inverted form by a switch 42. Following the optional inversion, the selected bitstream is input to an inverse alteration function 44. Function 44 is the inverse of the bitstream alteration function 18 applied at the encoder. A switch 46 selects the bitstream output from switch 42 in its inverse altered form or without inverse alteration. The selected bitstream is applied from switch 46 to a decoder 48. By properly actuating switches 38, 42 and 46, decoder 48 can be provided with the proper data for decoding and outputting the desired bitstream 52.

The decoder 48 can comprise, for example, a Viterbi decoder that determines a normalization rate, which is directly related to the error rate of data decoded thereby. The normalization rate determined by the decoder is input to a control processor 50, that actuates switches 38 and 42 via lines 58, 56, respectively on a trial and error basis in order to obtain the desired bitstream by hitting upon a switch combination that results in a low normalization rate (indicative of a low error rate) at the decoder. Control processor 50 also actuates switch 46 via line 54 depending on which of the I and Q bitstreams is the desired bitstream. If it is desired to recover the I data, which was altered by bitstream alteration function 18 at the encoder, switch 46 is actuated to receive the output of inverse alteration function 44. If it is desired to recover the Q data, which was not altered at the encoder, switch 46 is set to obtain data directly from the output of switch 42 without passing through the inverse alteration function.

The bitstream alteration function may have various time relationships to the data stream. For example, it may be synchronized in time to the encoder or it may be independent. Use of an alteration function that is independently synchronized may require the decoder to either search for synchronization patterns that the encoder has included in the data, or to try various time synchronizations by trial and error. If the inverse alteration function is a simple one-bit delay, for example, it will enable quick reacquisition of the waveform following a carrier phase slip. However, such an inverse alteration function will not facilitate the acquisition of the desired bitstream. This is because a one-bit delay will generate decoder errors if the decoder has been previously synchronized to the opposite bitstream.

If the alteration function is synchronized to the encoder, the decoder must be able to synchronize to both the altered and nonaltered bitstreams. For a block encoder, this will require the decoder to detect two synchronization patterns, which will add to the hardware complexity of the decoder. In addition, since the synchronization patterns are generally sent relatively infrequently, selection of the correct bitstream cannot be done until the block encoder (and hence the bitstream alteration function) is synchronized.

If the encoder is a convolutional encoder, it is advantageous to time synchronize the alteration function to the encoder's symbol period. In particular, where punctured convolutional codes are used for forward error correction (FEC), the resolution of puncture pattern ambiguity involves a process of trying up to N-1 alignments of symbols versus incoming data for a rate M/N code. Normalizations are accumulated in the FEC decoder over a period of several thousand symbols in order to determine whether or not alignment is successful. If the bitstream alteration is synchronized to the N-bit symbol, the search for puncture alignment, if successful, indicates that the desired bitstream has been found. If not successful, the implication is that the other bitstream is the bitstream of interest or that the bitstream is correct but inverted, or wrong and inverted. A trial and error search over the possibilities can be accomplished quickly in accordance with the present invention.

The following steps illustrate an example of the acquisition process that can be carried out by the decoder where a convolutional encoder and FEC decoder are provided and the bitstream alteration function is synchronized to the puncture pattern:

1. If the desired bitstream is the I data, switch 46 is set to receive data from the inverse alteration function 44. This setting is proper because the I bitstream is the one that was subjected to the alteration function 18 at the encoder. If, on the other hand, it is desired to recover the Q data, switch 46 is set to receive data directly from the output of switch 42, without passing through the inverse alteration function 44.
2. FEC decoder 48 then attempts to find a puncture alignment which produces a low rate of normalizations by adjusting bitstream delays within the decoder. If successful, the correct (i.e., desired) bitstream and polarity has been found, and the acquisition algorithm is exited by control processor 50.
3. If the normalization rate is too high (i.e., above a threshold) the problem may be that the correct bitstream has been selected, but it is inverted. Switch 42 is toggled to select the opposite polarity. Then, decoder 48 attempts to find a puncture alignment which produces a low rate of normalizations. If successful, the correct bitstream and polarity has been found, and the algorithm is exited.
4. If the decoder error rate is still too high, the problem may be that the incorrect nominal bitstream has been selected. Switch 38 is toggled to select the opposite nominal bitstream. Decoder 48 then attempts to find a puncture alignment which produces a low rate of normalizations. If successful, the correct bitstream and polarity has been found, and the acquisition algorithm is exited.
5. If the decoder error rate is still too high, the problem must be that although the correct bitstream has been selected, it is inverted. Switch 42 is again toggled to select the opposite polarity, and decoder 48 attempts to find a puncture alignment which produces a low rate of normalizations. If successful, the correct bitstream and polarity has been found, and the acquisition algorithm is exited. If the decoder error rate is still too high, acquisition has failed, presumably due to excessive channel noise. The acquisition algorithm is restarted commencing at step 2 above.

Once successful acquisition has been achieved, the decoder error rate may be monitored on a short-term basis over several thousand symbols. Since either an inverted bitstream or the selection of the incorrect bitstream will cause a high rate of errors to occur, the correct quadrature phase can be reacquired using the following procedure:
1. Upon detecting a high rate of decoder errors after acquisition, switch 34 is toggled to select the opposite bitstream. The decoder error rate is then monitored over the next several thousand symbols, and if the error rate drops to an acceptable value, the phase slip has been corrected and the tracking algorithm can be exited by control processor 50.
2. If the error rate is still too high, switch 42 is toggled to select the opposite inversion. The decoder error rate is monitored over the next several thousand symbols, and if the error rate drops to an acceptable value, the phase slip has been corrected and the tracking algorithm can be exited.
3. If the error rate is still too high, switch 34 is toggled to select the opposite bitstream. The decoder error rate is monitored over the next thousand symbols, and if the error rate drops to an acceptable value, the phase slip has been corrected and the tracking algorithm can be exited.
4. If the error rate is still too high, all switches are restored to their previous positions, and the tracking algorithm is exited, having failed to correct the phase slip. If errors persist, the tracking algorithm is reentered to again try to correct the phase slip.

Figure 3:
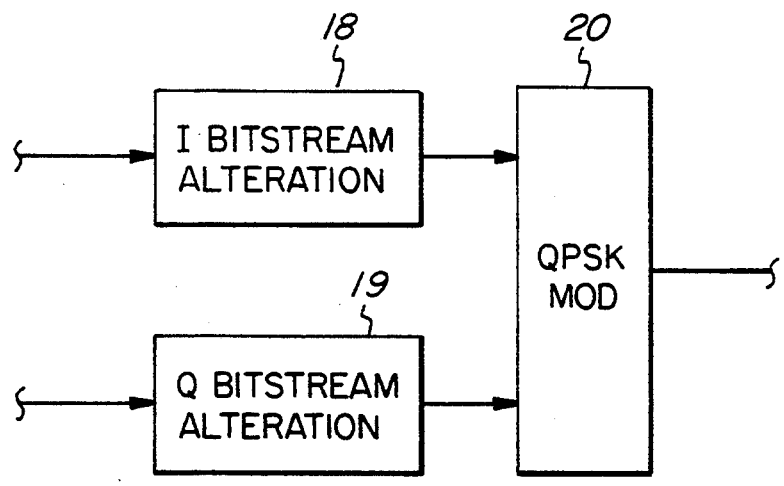
FIG. 3 is a block diagram illustrating an alternate embodiment of certain of the encoder components.
Figure 4:
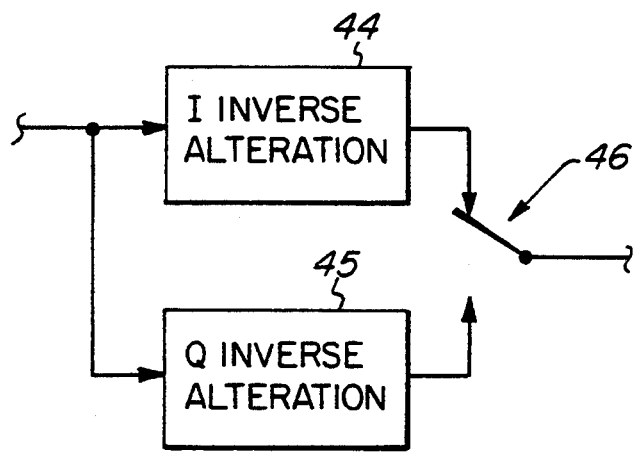
FIG. 4 is a block diagram illustrating an alternate embodiment of certain of the receiver components.

FIGS. 3 and 4 illustrate an alternate embodiment of the encoder and decoder, respectively. In the alternate embodiment, each of the I and Q bitstreams are subjected to a different bitstream alteration function at the encoder. In order to do this, a second bitstream alteration function 19 is provided in the embodiment of FIG. 1, between encoder 16 and QPSK modulator 20. This structure is illustrated in FIG. 3. All other components of the FIG. 1 embodiment remain the same. Similarly, the decoder must be provided with a second inverse alteration function 45 between switches 42 and 46. This is illustrated by FIG. 4. All other components of the decoder shown in FIG. 2 remain the same.

The bitstream alteration functions 18, 19, respectively, must be independent and distinct, such that the decoding of a data stream that has been altered by the I bitstream alteration function 18 cannot be decoded with an acceptable error rate if it is passed through the Q inverse alteration function 45. Conversely, the Q bitstream alteration function 19 must be such that a bitstream altered thereby cannot be decoded with a low error rate if it has been passed through the I inverse alteration function 44 at the decoder.

Any bitstream alteration functions having the required properties can be used. For example, the alteration functions can comprise simple delays, or every $n^{th}$ bit of the data stream can be inverted. Alternatively, the bitstream could be XOR'ed with a constant. Other alteration functions could comprise the use of a look up function or the inversion of the symbol bits to prevent the decoder from obtaining proper normalization. Other possible alteration functions will be apparent to those skilled in the art.

It should now be appreciated that the present invention provides a scheme for recovering a desired quadrature modulated bitstream at a decoder. One or both of the bitstreams are altered by an invertible alteration function at the encoder. The inverse function(s) are applied at the decoder. A high rate of errors will result for the altered bitstream if the proper inverse alteration function is not applied at the decoder. As a result of this property, the desired bitstream can be obtained at the decoder by a trial and error process. Tracking of carrier phase slips is also provided at the decoder.

Although various embodiments of the invention have been described herein, those skilled in the art will appreciate that numerous adaptations and modifications may be made thereto without departing from the spirit and scope of the invention as set forth in the claims.

We claim:
1. Apparatus for communicating dual bitstream quadrature modulated digital data comprising:
a first encoder for encoding a first stream of digital information data;
a second encoder for encoding a second stream of digital information data;
means for applying an invertible alteration function to said first stream of data, said function being chosen to render said first and second streams mutually orthogonal and to alter said first stream in a manner that will produce a high error rate if said first stream is decoded without first applying the inverse of said alteration function; and
means for quadrature modulating said altered first stream of data and said second stream of data to provide separate in-phase (I) and quadrature (Q) data streams for transmission.

2. Communication apparatus for communicating dual bitstream quadrature modulated digital data for receipt by a receive apparatus, said communication apparatus comprising:

a first encoder for encoding a first stream of digital information data;

a second encoder for encoding a second stream of digital information data;

means for applying an invertible alteration function to said first stream of data to alter said first stream in a manner that will produce a high error rate if said first stream is decoded without first applying the inverse of said alteration function;

means for quadrature modulating said altered first stream of data and said second stream of data to provide separate in-phase (I) and quadrature (Q) data streams for transmission;

said receive apparatus being capable of recovering a desired one of said first and second information streams from quadrature modulated data transmitted by said communication apparatus and including:

a quadrature demodulator coupled to receive said quadrature modulated data, said demodulator outputting a demodulated in-phase (I) bitstream and a demodulated quadrature (Q) bitstream;

first switch means coupled to said demodulator for selecting one of said demodulated I and Q bitstreams;

an inverter coupled to invert the bitstream selected by said first switch means;

second switch means for selectively outputting either the bitstream selected by said first switch means or the inverted bitstream from said inverter;

means for applying the inverse of said alteration function to the bitstream output from said second switch means;

a decoder for receiving either the bitstream output from said second switch means or an inverse altered version thereof from said inverse alteration function applying means; and third switch means for selecting the desired one of said first and second information streams by selectively outputting to said decoder either the bitstream output from said second switch means or the inverse altered version thereof.

3. Communication apparatus in accordance with claim 2 wherein said decoder determines an error rate of data decoded thereby, said receiver further comprising:

means responsive to said error rate determination for actuating said first and second switch means to achieve an acceptable error rate by trial and error.

4. Communication apparatus in accordance with claim 3 wherein said alteration function is not synchronized in time with said first encoder, said receiver further comprising:

means for synchronizing said inverse alteration function applying means with said alteration function applying means.

5. Communication apparatus in accordance with claim 4 wherein said synchronizing means are responsive to said error rate determination for obtaining synchronization by trial and error.

6. Communication apparatus in accordance with claim 3 further comprising:

means for monitoring the error rate determined by said decoder on an ongoing basis;

wherein said means for actuating said first and second switch means are responsive to said monitoring means for reactuating said switches to return to an acceptable error rate in the event that the error rate rises above an acceptable level.

7. Communication apparatus in accordance with claim 6 further comprising:

means for applying a second invertible alteration function to said second stream of data to alter said second stream in a manner that will produce a high error rate if said second stream is decoded without first applying the inverse of said alteration function; and means provided at said receiver for applying the inverse of said second alteration function to the bitstream output from said second switch means;

wherein said third switch means select the desired one of said first and second information streams by selectively outputting to said decoder either the bitstream output from said inverse alteration function applying means or the bitstream output from said second inverse alteration function applying means.

8. Communication apparatus in accordance with claim 3 wherein:

said decoder comprises a Viterbi decoder; and said error rate is inferred from a normalization rate of said Viterbi decoder.

9. Communication apparatus in accordance with claim 2 further comprising:

means for applying a second invertible alteration function to said second stream of data to alter said second stream in a manner that will produce a high error rate if said second stream is decoded without first applying the inverse of said alteration function; and means provided at said receiver for applying the inverse of said second alteration function to the bitstream output from said second switch means;

wherein said third switch means select the desired one of said first and second information streams by selectively outputting to said decoder either the bitstream output from said inverse alteration function applying means or the bitstream output from said second inverse alteration function applying means.

10. A receiver for recovering a desired information stream from a pair of independent bitstreams transmitted using quadrature modulation, one of said independent bitstreams having been altered by an invertible alteration function prior to transmission, said receiver comprising:

a quadrature demodulator coupled to receive quadrature modulated data, said demodulator outputting a demodulated in-phase (I) bitstream and a demodulated quadrature (Q) bitstream;

first switch means coupled to said demodulator for selecting one of said demodulated I and Q bitstreams;

an inverter coupled to invert the bitstream selected by said first switch means;

second switch means for selectively outputting either the inverted bitstream from said inverter or the bitstream selected by said first switch means;

means for applying the inverse of said alteration function to the bitstream output from said second switch means;

a decoder for receiving either the bitstream output from said second switch means or an inverse altered version thereof from said inverse alteration function applying means; and third switch means for selecting the desired information stream by selectively outputting to said decoder either the bitstream output from said second switch means or the inverse altered version thereof.

11. Receiver apparatus in accordance with claim 10 wherein said decoder determines an error rate of data decoded thereby, said apparatus further comprising:

means responsive to said error rate determination for actuating said first and second switch means to achieve an acceptable error rate by trial and error.

12. Receiver apparatus in accordance with claim 11 wherein:

said decoder comprises a Viterbi decoder; and said error rate is inferred from a normalization rate of said Viterbi decoder.

13. Receiver apparatus in accordance with claim 11 wherein said alteration function is not synchronized in time with at least one of said independent bitstreams, said apparatus further comprising:

means for synchronizing said inverse alteration function applying means with the alteration function applied prior to transmission.

14. Receiver apparatus in accordance with claim 13 wherein said synchronizing means are responsive to said error rate determination for obtaining synchronization by trial and error.

15. Receiver apparatus in accordance with claim 11 further comprising:

means for monitoring the error rate determined by said decoder on an ongoing basis;

wherein said means for actuating said first and second switch means are responsive to said monitoring means for reactuating said switches to return to an acceptable error rate in the event that the error rate rises above an acceptable level.

16. Receiver apparatus in accordance with claim 15 wherein the other of said independent bitstreams was altered prior to transmission by a second invertible alteration function, said receiver apparatus further comprising:

means for applying the inverse of said second alteration function to the bitstream output from said second switch means;

wherein said third switch means select the desired information stream by selectively outputting to said decoder either the bitstream output from said inverse alteration function applying means or the bitstream output from said second inverse alteration function applying means.

17. Receiver apparatus in accordance with claim 10 wherein the other of said independent bitstreams is altered prior to transmission by a second invertible alteration function, said receiver apparatus further comprising:

means or applying the inverse of said second alteration function to the bitstream output from said second switch means;

wherein said third switch means select the desired information stream by selectively outputting to said decoder either the bitstream output from said inverse alteration function applying means or the bitstream output from said second inverse alteration function applying means.

18. A method for recovering a desired information stream from a pair of independent bitstreams transmitted using quadrature modulation, one of said independent bitstreams having been altered by an invertible alteration function prior to transmission, comprising the steps of:

demodulating said quadrature modulated bitstreams to provide a demodulated in-phase (I) bitstream and a demodulated quadrature (Q) bitstream;

tentatively providing one of said demodulated I and Q bitstreams for decoding;

optionally inverting the tentatively provided bitstream;

decoding one of the tentatively provided bitstream and the optionally inverted bitstream if it is desired to recover the bitstream that was not altered by said alteration function prior to transmission;

decoding one of the tentatively provided bitstream and the optionally inverted bitstream after applying the inverse of said alteration function thereto if it is desired to recover the bitstream that was altered by said alteration function prior to transmission;

determining an error rate of data decoded during the decoding step; and if the error rate is not acceptable, trying different choices of said demodulated I and Q bitstreams with and without inversion to attempt to obtain an acceptable error rate.

19. A method in accordance with claim 18 wherein each of said independent bitstreams has been altered prior to transmission with a different invertible alteration function, and said decoding step comprises the step of:

decoding one of the tentatively provided bitstream and the optionally inverted bitstream after applying the inverse of the alteration function that was used to alter the bitstream that is desired to be recovered.

20. A method in accordance with claim 18 wherein said determining step infers said error rate from a decoder normalization rate.

* * * * *